United States Patent
Andreoli-Fang et al.

(10) Patent No.: US 11,070,991 B2
(45) Date of Patent: *Jul. 20, 2021

(54) COMMUNICATIONS WHEN ENCOUNTERING AGGRESSIVE COMMUNICATION SYSTEMS

(71) Applicant: CABLE TELEVISION LABORATORIES, INC., Louisville, CO (US)

(72) Inventors: Jennifer Andreoli-Fang, Boulder, CO (US); Alireza Babaei, Herndon, VA (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/889,345

(22) Filed: Jun. 1, 2020

(65) Prior Publication Data

US 2020/0296605 A1 Sep. 17, 2020

Related U.S. Application Data

(63) Continuation of application No. 15/726,790, filed on Oct. 6, 2017, now Pat. No. 10,674,378, which is a
(Continued)

(51) Int. Cl.
*H04W 72/00* (2009.01)
*H04W 24/02* (2009.01)
(Continued)

(52) U.S. Cl.
CPC ........... *H04W 24/02* (2013.01); *H04W 72/02* (2013.01); *H04W 72/0446* (2013.01);
(Continued)

(58) Field of Classification Search
CPC ..... H04W 84/12; H04W 74/02; H04W 88/10; H04W 56/00; H04W 72/042; H04W 72/1289; H04W 92/02; H04L 25/0204
See application file for complete search history.

(56) References Cited

U.S. PATENT DOCUMENTS

| | | |
|---|---|---|
| 2005/0075141 A1 | 4/2005 | Hoffmann et al. |
| 2005/0075142 A1 | 4/2005 | Hoffmann et al. |

(Continued)

*Primary Examiner* — Khalid W Shaheed
(74) *Attorney, Agent, or Firm* — David Daniel Smith; Cable Television Laboratories, Inc.

(57) ABSTRACT

Systems and methods presented herein provide for improving communications when encountering aggressive communication systems. In one embodiment, a communication system comprises a wireless access point operable to link a first user equipment (UE) to a WiFi network via a contention based mode that directs the WAP to share radio frequency spectrum with other WAPs. The communication system also comprises a communication processor operable to query at least the first UE to determine aggressive radio frequency (RF) band activity by another communication system in range of the WAP, to determine that the aggressive RF band activity by the other communication system is pushing communication with the first UE via the WAP below a threshold level, and based on the determination, direct the WAP to switch to a contention free mode to communicate with the first UE in contention free mode.

15 Claims, 9 Drawing Sheets

Related U.S. Application Data continuation of application No. 14/940,913, filed on Nov. 13, 2015, now Pat. No. 9,788,217.

(51) Int. Cl.
| | |
|---|---|
| *H04W 72/02* | (2009.01) |
| *H04W 74/08* | (2009.01) |
| *H04W 72/04* | (2009.01) |
| *H04W 84/12* | (2009.01) |
| *H04W 72/12* | (2009.01) |

(52) U.S. Cl.
CPC .... *H04W 72/1226* (2013.01); *H04W 74/0816* (2013.01); *H04W 74/0833* (2013.01); *H04W 84/12* (2013.01)

(56) References Cited

U.S. PATENT DOCUMENTS

| | | | |
|---|---|---|---|
| 2007/0223434 | A1 | 9/2007 | Bennett |
| 2010/0014423 | A1* | 1/2010 | Furuskar ............... H04W 74/02 370/235 |
| 2011/0243025 | A1* | 10/2011 | Kim ..................... H04L 5/0023 370/252 |
| 2014/0213219 | A1* | 7/2014 | Mohebbi ............... H04W 76/12 455/411 |
| 2015/0163824 | A1 | 6/2015 | Krzymien et al. |
| 2016/0094317 | A1 | 3/2016 | Erceg et al. |
| 2016/0205562 | A1 | 7/2016 | Wei |
| 2016/0295580 | A1* | 10/2016 | Katar ................. H04W 74/002 |

* cited by examiner

| Link Adaptation Control | Calibration Pos.\| Seq. | Un-Used 351 | CSI | AC | NDP | RDG |
|---|---|---|---|---|---|---|
| | | | | | Un-Used 352 | | bits | 16 | 2 | 2 | 2 | 2 | 1 | 1 | 5 | 1 | 1 |

MRQ, Reserved 361, VHT, MRQ Sequence/STBC, MFB Sequence/Group ID, MFB, Feedback Type, Code Type, Group ID, Unsolicited MFB, AC, RDG

| 1 | 1 | 1 | 3 | 3 | 15 | 3 | 1 | 1 | 1 | 1 | 1 |

COMMUNICATIONS WHEN ENCOUNTERING AGGRESSIVE COMMUNICATION SYSTEMS

CROSS-REFERENCE TO RELATED APPLICATION

This application is a continuation of U.S. application Ser. No. 15/726,790, filed Oct. 6, 2017, which application a continuation of U.S. application Ser. No. 14/940,913, filed Nov. 13, 2015, the disclosure and benefit of which is hereby incorporated in its entirety by reference herein.

BACKGROUND

Communication systems exist in a variety of forms operating at numerous frequency ranges. For example, in North America, frequency ranges for Long Term Evolution (LTE) networks operate at 700, 750, 800, 850, 1900, 1700, 2100, 2500 and 2600 MHz. These frequency ranges correspond to government licensed bands of 2, 4, 7, 12, 13, 17, 25, 26, and 41, respectively. In these bands, the Federal Communications Commission (FCC), a government licensing authority, assures that communication networks do not interfere with one another. In other bands, such as the ISM (industrial, scientific and medical) bands, government licensing agencies generally allow communications systems to operate freely because interference between communication systems at these much higher frequency ranges is often limited by distance. However, some communications systems are finding themselves in relatively close proximity with one another at these frequencies, leading to a competition for radio frequency (RF) resources. Accordingly, some of these communication systems, such as WiFi, have developed protocols that ensure each system shares resources fairly.

Unfortunately, not all of these communication technologies share the same fairness and resource allocation policies. For example, as the government licensed the bands to LTE networks, there was no need for the technology to adopt any type of spectrum sharing policies because each network had sole use of its frequency band. Accordingly, when LTE communication systems invade other unlicensed spectrums, they tend to occupy all of the frequency resources of the spectrums and interfere with other communication systems.

SUMMARY

Systems and methods presented herein provide for improving communications when encountering aggressive communication systems. In one embodiment, a communication system comprises a wireless access point operable to link a first user equipment (UE) to a WiFi network via a contention based mode that directs the WAP to share radio frequency spectrum with other WAPs. The communication system also comprises a communication processor operable to query at least the first UE to determine aggressive radio frequency (RF) band activity by another communication system in range of the WAP, to determine that the aggressive RF band activity by the other communication system is pushing communication with the first UE via the WAP below a threshold level, and based on the determination, direct the WAP to switch to a contention free mode to communicate with the first UE in contention free mode.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

FIGS. 7 and 8 are block diagrams of data frames illustrating bits for use in messaging a UE.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
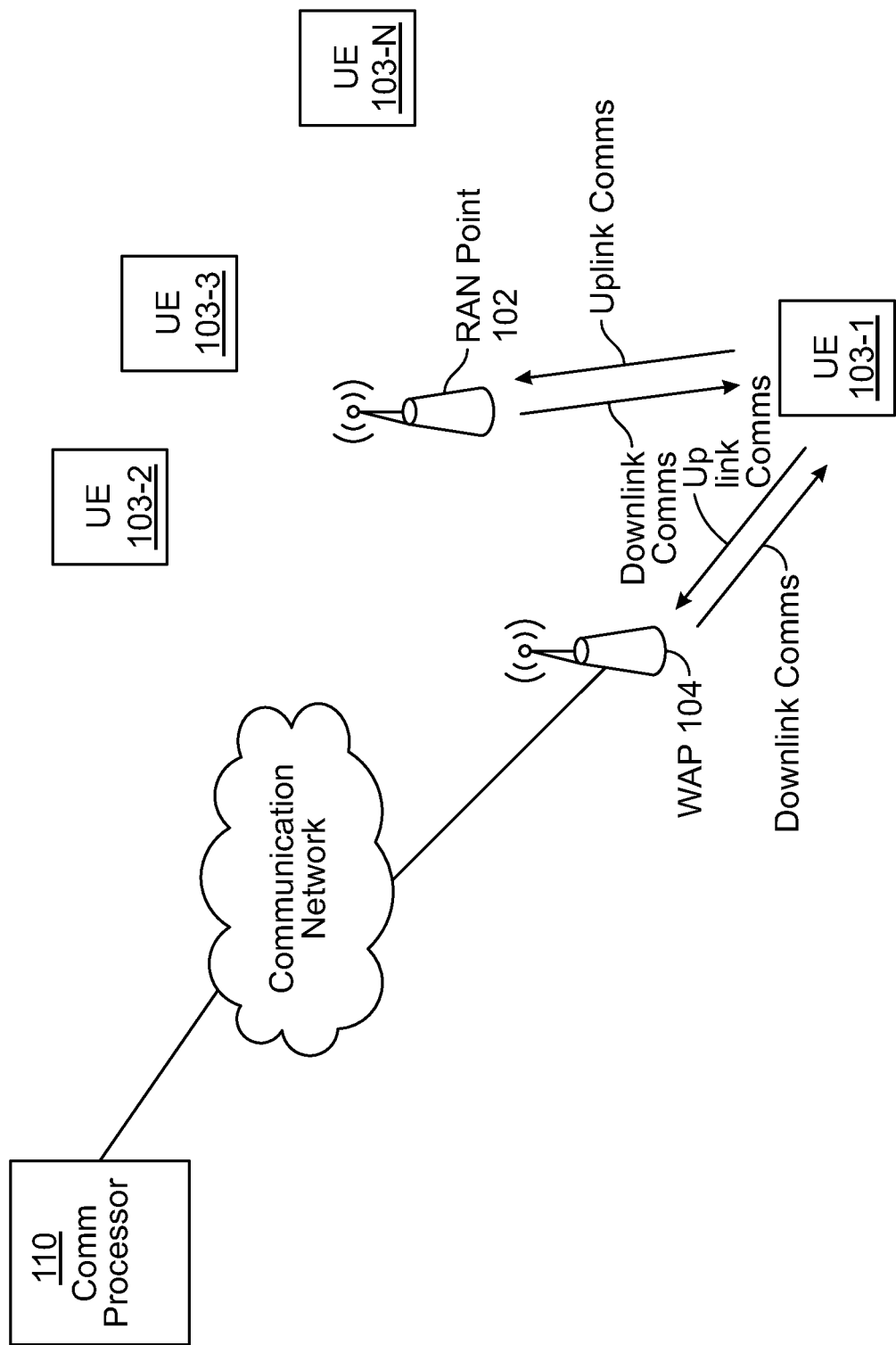
FIG. 1 is a block diagram of an exemplary communication system operable when encountering aggressive behavior from other communication systems.

FIG. 1 is a block diagram of an exemplary communication system operable when encountering aggressive behavior from other communication systems. The communication system includes a communication processor 110 that is coupled to a WAP 104 through a communication network 105. The communication processor 110 is operable to detect aggressive behavior from the radio access network (RAN) point 102 communicating with one or more the UEs 103-1-103-N in the vicinity of the WAP 103. For example, the UE 103-1 may be communicating with the communication network 105 through the WAP 104 under one communication protocol. Other UEs 103 in the area may be communicating with the RAN point 102 via another different communication protocol. Communications from these other UEs 103 with the RAN point 102 may interfere with the communications of UEs 103 trying to communicate through the WAP 104. The communication processor 110 is operable to detect this aggressive activity and estimate a rate of successful communication with a UE (e.g., UE 103-1) via the WAP 104 based on some of the UEs 103 (e.g., UEs 103-2-103-N, wherein the reference number "N" is merely intended to represent an integer greater than 1 and not necessarily equal to any other "N" references herein) communicating with the RAN point 102 via the other communication protocol.

Examples of the UEs 103 include cellular phones, laptop computers, tablet computers, and the like. Generally, the WAP 104 operates on one protocol and the RAN point 102 operates on another different protocol. However, the communication processor 110 may also be operable to detect aggressive activity in an RF band from another communication system using the same communication protocol as the WAP 104. In any case, the communication processor 110 is operable to detect aggressive activity by another communication system, determine the ability of the UE 103 to communicate through the WAP 104, and circumvent the aggressive activity of the other communication system. Examples of the communication processor 110 include network elements operable with the communication network 105 (e.g., communication switches, routers, network servers, etc.). Although the communication processor 110 was discussed as being configured external to the WAP 104, alternative embodiments include the communication processor 110 being configured with the WAP 104.

Examples of the communication system include a WiFi network being interfered with by an LTE network. For example, LTE communications are increasingly moving into unlicensed RF bands where WiFi communications predominately exist (e.g., the ISM band). Accordingly, the embodiments herein may be operable to detect aggressive activity by an LTE network and work to overcome any interference by the LTE network. However, the invention is not intended to be limited to WiFi communications being interfered with by LTE communications. Rather, the embodiments herein are intended to provide an understanding of how one communication system operating under a communication protocol can work to overcome aggressive activity by another communication system operating under a different communication protocol. Other exemplary embodiments are shown and described below.

Figure 2:
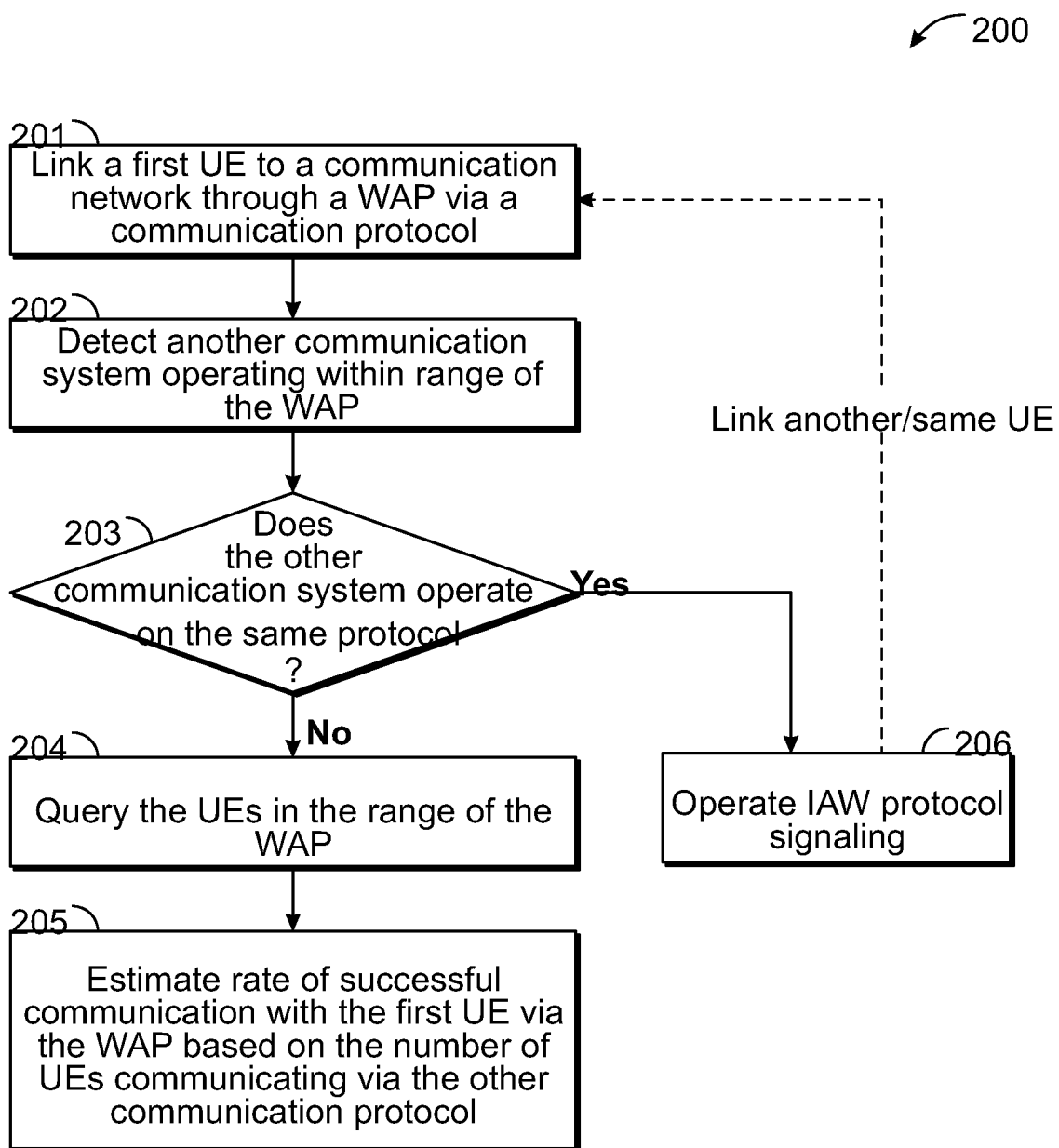
FIG. 2 is a flowchart illustrating an exemplary process of the communication system of FIG. 1.

FIG. 2 is a flowchart illustrating an exemplary process 200 of the communication system of FIG. 1. In this embodiment, the WAP 104 links a first UE 103 (e.g., UE 103-1) to the communication network 105 using a first communication protocol, in the process element 201. From there, the communication processor 110 detects another communication system operating within range of the WAP 104, in the process element 202. The communication processor 110 then determines whether the other communication system is operating on the same protocol as that of the WAP 104, in the process element 203.

For example, if the WAP 104 is part of a WiFi communication network using the 802.11 IEEE protocol and the RAN point 102 is operating under the same WiFi protocol, then the WAP 104 understands how to communicate with the UE 103-1 based on contention procedures within the 802.11 IEEE protocol so that both WiFi networks can coexist. However, if the RAN point 102 is part of an LTE network, the LTE network may attempt to acquire as much of the RF band as it needs without regard to any other systems, such as WiFi. And, since the WAP 104 would not understand how to coexist with another communication network, the LTE communications may severely degrade or even destroy any possibility of the WAP 104 communicating with the UE 103-1.

Accordingly, if the other communication system is operating in accordance with the protocol signaling of the WAP 104, then the WAP 104 may implement its "back off" procedures to ensure that the WAP 104 coexists with the RAN 102, in the process element 206. From there, the WAP 104 and the communication processor 110 may link another or the same UE 103 to the WAP 104 in the process element 201. That is, the communication processor 110 may continually evaluate whether communications are likely to be successful for the UEs 103. But, if the RAN 102 is operating on a different communication protocol than the WAP 104 so as to potentially interfere with the WAP 104, then the communication processor 110 queries the UEs 103 within range of the WAP 104, in the process element 204. From there, the communication processor 110 estimates a successful communication with the first UE 103 (e.g., the UE 103-1), in the process element 205, based on the number of UEs 103 communicating via the other communication protocol.

To illustrate, LTE-U (also known as Licensed-Assisted Access LTE, or "LAA-LTE") is a form of LTE communications in the unlicensed band. And, this form of communications is being rapidly implemented so as to provide LTE "hotspots" for subscriber UEs 103. Although WiFi networks have traditionally been the dominant technology utilizing the unlicensed spectrum, the advent of LTE-U will likely change the manner in which the "free" spectrum is occupied. WiFi traditionally coexists well with other WiFi networks due to the standardized, contention-based MAC (media access control) protocol that is implemented by most WiFi equipment. The DCF (distributed coordinated function) and the EDCA (enhanced distributed channel access) of the MAC ensures when multiple WiFi networks occupy the same spectrum in the vicinity of each other so as to ensure that each network shares the resources fairly.

LTE on the other hand is a different Radio Access Technology (RAT) that uses a different channel access algorithm that can aggressively occupy a channel in an RF band, potentially interfering with any neighboring WiFi access points. Using the baseline behavior of DCF/EDCA MAC, WiFi equipment can be configured to detect aggressive behavior of other users of the unlicensed band in the vicinity without any changes to the existing MAC protocol implementations at the WAP 104 and/or in the UEs 103 themselves. Once aggressive behavior is detected, the communication processor 110 can then determine how to ensure the performance of WiFi communications with the UE 103 are not adversely harmed through channel reservation of the LTE network.

Consider a WiFi network with one WAP and "N" number of users. The WAP of the WiFi network may detect the presence of another RAN via UEs 103 that are capable of decoding multiple radio access technologies, such as WiFi and LTE. In doing so, the WiFi network (e.g., communication processor 110 and the WAP 104) estimates the number of UEs 103 associated with the WiFi network and the number of UEs 103 associated with the LTE network.

In one embodiment, the communication processor 110 directs the UEs 103 to turn on their LTE radios to detect a number of their LTE neighbors and report back to the WAP 104. The UEs 103 may also report the MAC addresses of their LTE neighbors back to the WAP 104. Based on a union of MAC addresses of LTE neighbors reported by the UEs 103, the communication processor 110 can estimate the number of LTE users within the range of its WiFi network. Once the number of users for the WiFi network and for the neighboring network(s) has been estimated, the communication processor 110 obtains the statistics of its own successful channel access (e.g., based on a rolling time window a previous channel accesses), and compares it to a baseline/threshold probability of success for communication and/or a communication probability for a particular UE 103.

Figure 3:
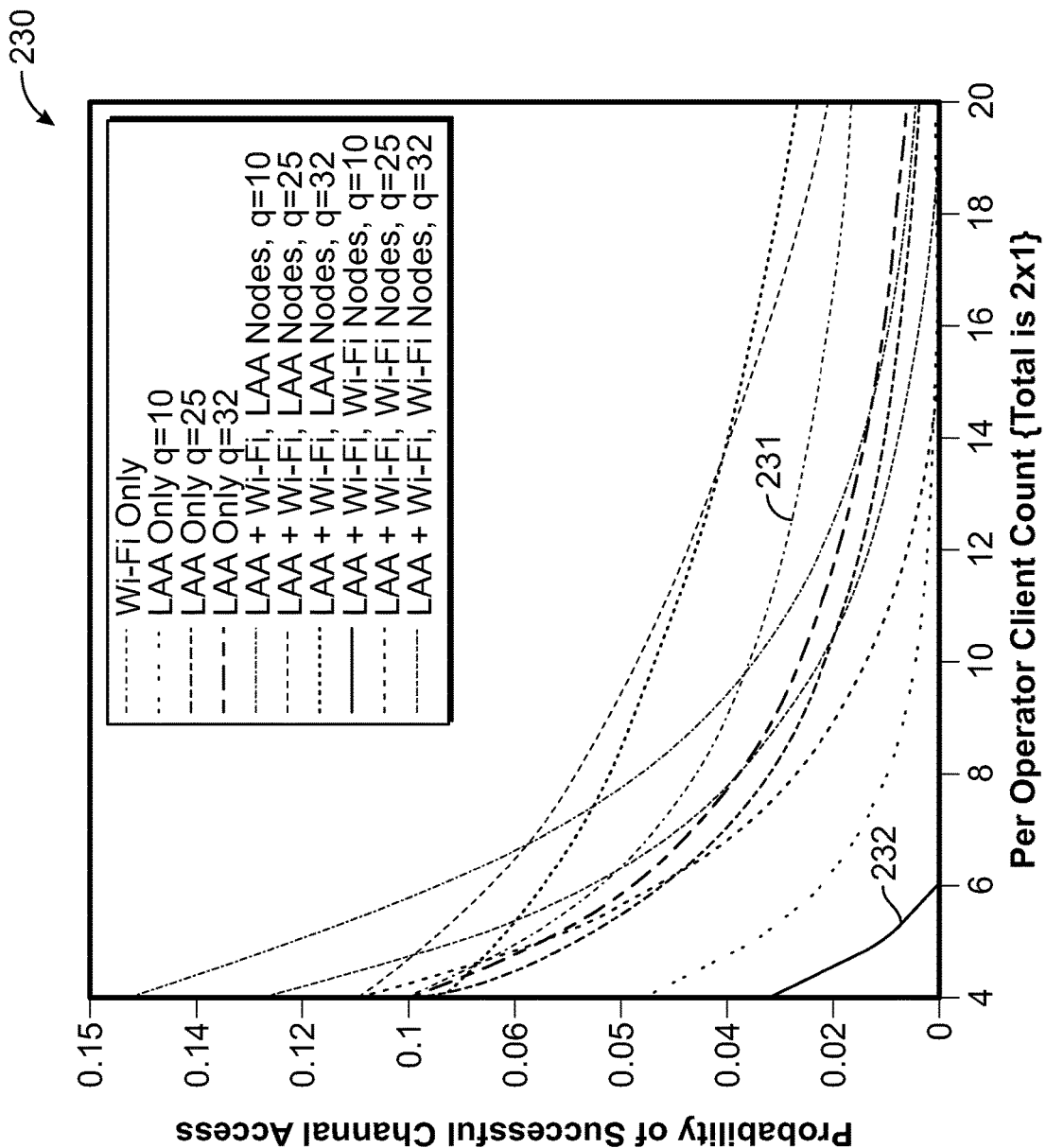
FIG. 3 is a graph illustrating communication success rates when an LTE network is within range of a WiFi Network.

Generally, the baseline probability of successful channel access is a theoretical probability computed for multiple networks of the same type. For example, graph 230 of FIG. 3 illustrates when an LTE network is present within the range of a WiFi Network. The curve 231 shows the case when two WiFi networks coexist with each other. In this embodiment, the curve 231 is used as a baseline that WiFi networks coexist fairly well with each other (e.g., by sharing resources equally). The probability of successful channel access is a function of the number of users associated with the WiFi network (e.g., WAP 104) and the number of users associated with another network within range of the WiFi network The baseline curve 231 can be computed for a variety of cases, including multiple networks in the vicinity of the WAP 104 and/or multiple UEs 103 in each network. The baseline 231 may be computed offline by the communication processor 110, stored in a database, and pushed to the WAP 104 to reduce the computation burden on the WAP 104.

To illustrate, an LAA-LTE network is present within the range of the WiFi Network as shown in FIG. 3. A data point on the curve 232 represents actual statistics collected by a WiFi network WAP. The communication processor 110 compares the collected data point to the corresponding baseline on the curve 231 for the same number of UEs 103, and determines that the actual successful channel access rate is significantly lower than the baseline. Accordingly, the WAP 104/communication processor 110 of a WiFi Network embodiment determines that the LAA network is behaving aggressively.

Figure 4:
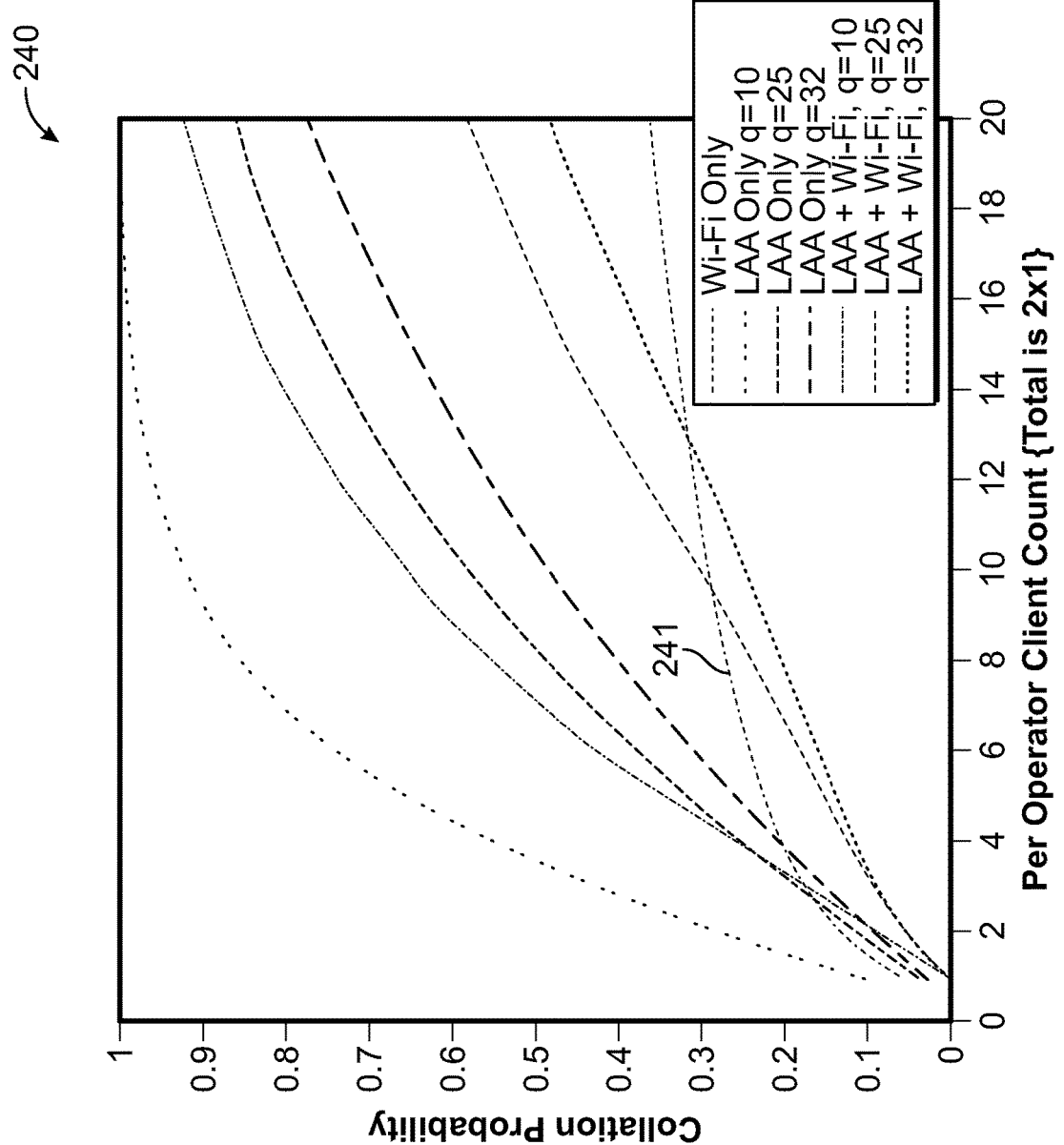
FIG. 4 is a graph illustrating a baseline collision probability when an LTE network is within range of a WiFi Network.

The graph 240 of FIG. 4 illustrates baseline collision probability that can be used by the network WAP. For example, instead of or in addition to determining the probability of successful transmission, the WAP 104/communication processor 110 can determine the probability of a collision when encountering aggressive activity by another network (e.g., the RAN 102). The baseline curve 241 illustrates when how communications collisions with others can be overcome through standard communications. For example, for data points under the curve 241, collision probability is relatively low meaning there is no need to change communication strategies. However, data points above the curve 241 mean that collisions are likely to occur and that another network is behaving aggressively. So, the WAP 104 may need to change its communication strategy, as discussed below.

Figure 5:
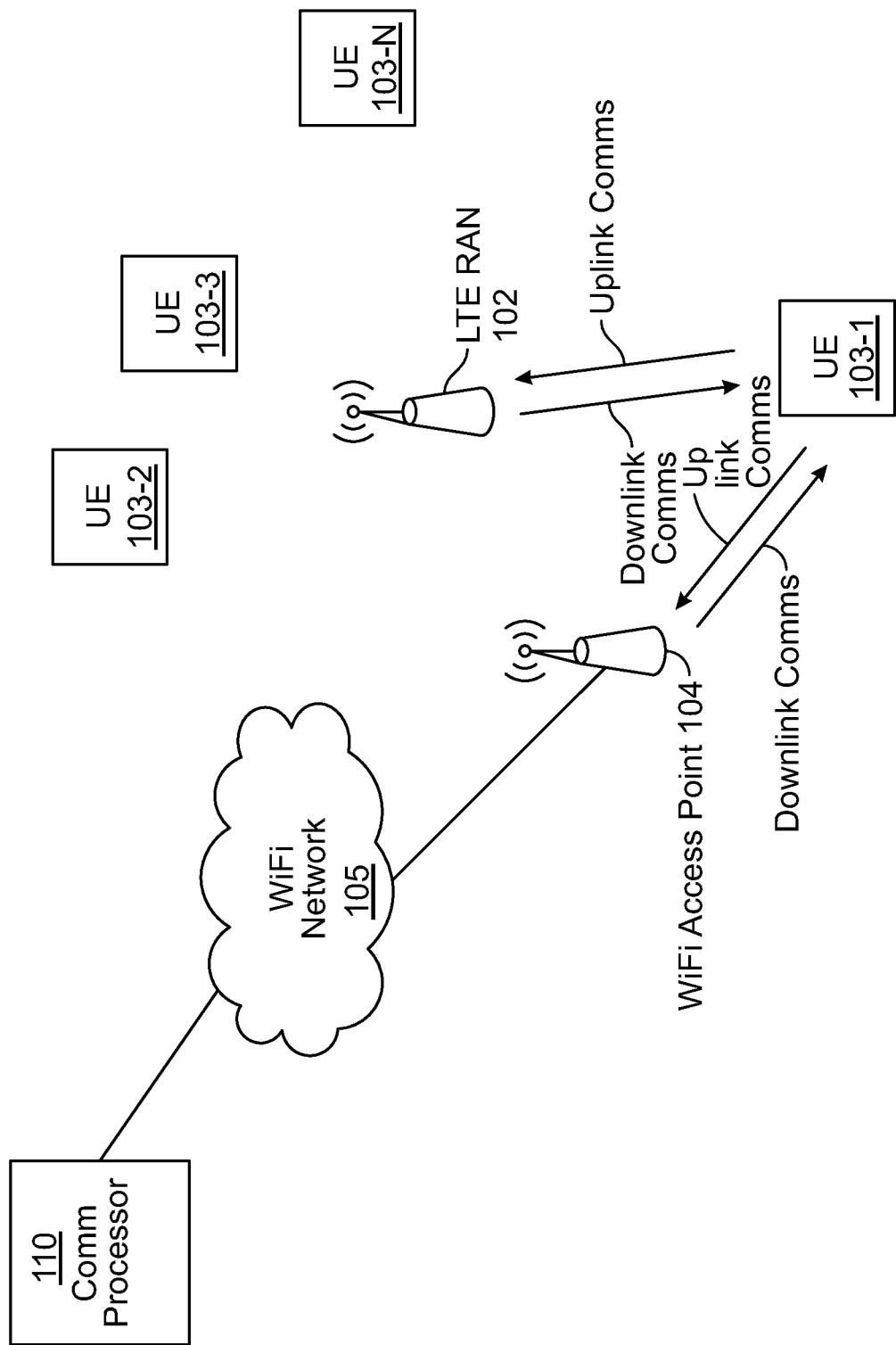
FIG. 5 is a block diagram of a WiFi communication system operable when encountering aggressive behavior from an LTE communication system.

Once the communication processor 110 determines that the other network is behaving aggressively, the communication processor 110 can identify ways to overcome the aggressive activity of the other network. FIG. 5 is a block diagram of a WiFi communication system operable when encountering aggressive behavior from an LTE communication system. In this embodiment, the WAP 104 is a WiFi WAP and the RAN point 102 is an LTE RAN point. However, the invention is not intended to be limited simply to WiFi and LTE as other communication technologies may be used. For example, the inventive aspects herein may be used in any communication systems that do not have contention mechanisms built in when encountering different communication technologies.

Existing implementations of WiFi networks follow the contention-based DCF and EDCA MAC protocols when contending with other WiFi networks for RF resources. However, WiFi networks may reserve the medium for the WiFi WAP 104 to override the regular DCF/EDCA back off mechanisms. For example, in response to other aggressive users of unlicensed spectrum, the communication processor 110 may override the backoff mechanisms such that the WiFi WAP 104 remains in "LISTEN" mode if other WiFi WAPs follow the regular 802.11 back off rules. Alternatively or additionally, CSMA (Carrier sense multiple access) contention-based medium access becomes inefficient and channel utilization degrades when a large number of WiFi WAPs contend for a channel due to a high number of collisions. Accordingly, WiFi WAPs can employ a schedule-based access to the medium, which improves the channel utilization.

Without changing the baseline DCF/EDCA MAC protocol implementation, the communication processor 110 can enable the WiFi WAP 104 to access the medium according to a schedule and in a contention-free manner. For example, default access to the medium by WiFi WAPs will remain contention-based. When the WiFi WAP 104 perceives that contention-free access to the medium is necessary (e.g., when aggressive behavior from other users of the unlicensed spectrum is detected or when the level of contention is so high that it leads to poor channel utilization if WAPs follow the regular contention-based medium access rules), the WAP triggers the UEs 103.

Consider the WiFi network 105 with one WiFi WAP 104 and "N" UEs 103 associated with the WAP 104. The WiFi WAP 104 "knows" the identity of its associated UEs 103 through their MAC addresses. The WiFi WAP 104 determines that it needs to grant its associated UEs 103 (or some subset of them, "M", wherein "M" is also an integer greater than 1 and not necessarily equal to any other "M" reference herein) access the medium in a contention-free manner. This group is denoted as the "contention-free group". The WAP 104 may perceive interference from aggressive interference sources on the "M" UEs 103. Accordingly, the WAP 104 may perceive a high level of contention and low channel utilization as measured through the collision rate.

Figure 6:
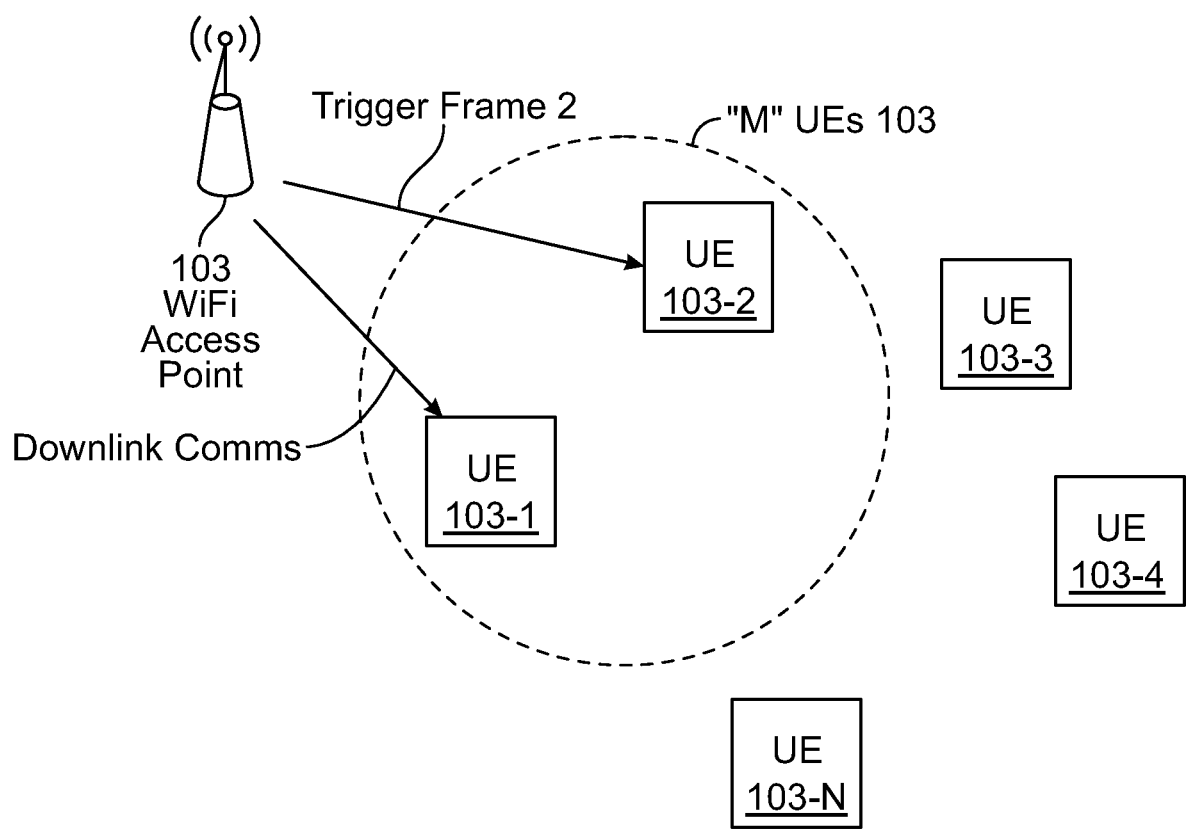
FIG. 6 is a block diagram illustrating how a WiFi WAP groups UEs for contention free access.

The WAP 104 may send a "trigger frame", which is a short payload-free packet containing PHY and MAC layer headers destined to the "M" number of UEs 103 of the contention-free group one at a time as illustrated in FIG. 6. The WAP 104 may set one of the currently unused bits in the MAC header to indicate to all of its "N" associated UEs 103 that the UE 103 whose MAC address matches the RA (receiver address) field of the MAC header is allowed to over-ride the regular channel sensing and back off mechanism to transmit its packet immediately. In doing so, the WAP 104 may set the length field in the MAC header of the trigger frame equal to a predefined value.

The other "N−1" clients (i.e., whose MAC address do not match) will set their network allocation vectors (NAVs) and freeze their back off timers accordingly. Examples of the unused bits in the MPDU (media access control protocol data unit) header that can be used are in the HT capabilities field. For example, the HT capabilities of the MAC provides modulation and coding scheme (MCS) values which are supported by the WiFi WAP 104. These data rates can be used by both the WAP 104 and a UE 103 to send unicast traffic back and forth. However, some of these bits are unused in the 802.11n HT capabilities field and can be used to indicate to the UE 103 to switch to contention free access. Alternatively or additionally, a reserved bit in the HT capabilities field of 802.11ac can be used. Examples of these are illustrated in FIGS. 7 and 8.

FIG. 7 illustrates the 802.11n HT capabilities field 350 having unused bits 351 and 352 being capable of employing the messaging used to direct the UEs 103 to employ contention free access. FIG. 8 illustrates the 802.11ac HT capabilities field 360 with the reserved bit 361 being capable of employing the messaging used to direct the UEs 103 to employ contention free access.

Each of the "M" clients in the contention-free group, upon receiving the opportunity to transmit, looks at the packets in its queue and sends a frame whose length plus the ACK (acknowledgment) from the WAP 104 is less than the predefined length value. If the length of all of the available packets is more than this predefined value, then the UE 103 will send an ACK indicating to the WAP 104 that it cannot use this transmission opportunity. The WAP 104 may then provide multiple transmission opportunities for a particular UE 103 by sending multiple trigger frames with the UE 103's MAC address in the RA field of MPDU.

Figure 9:
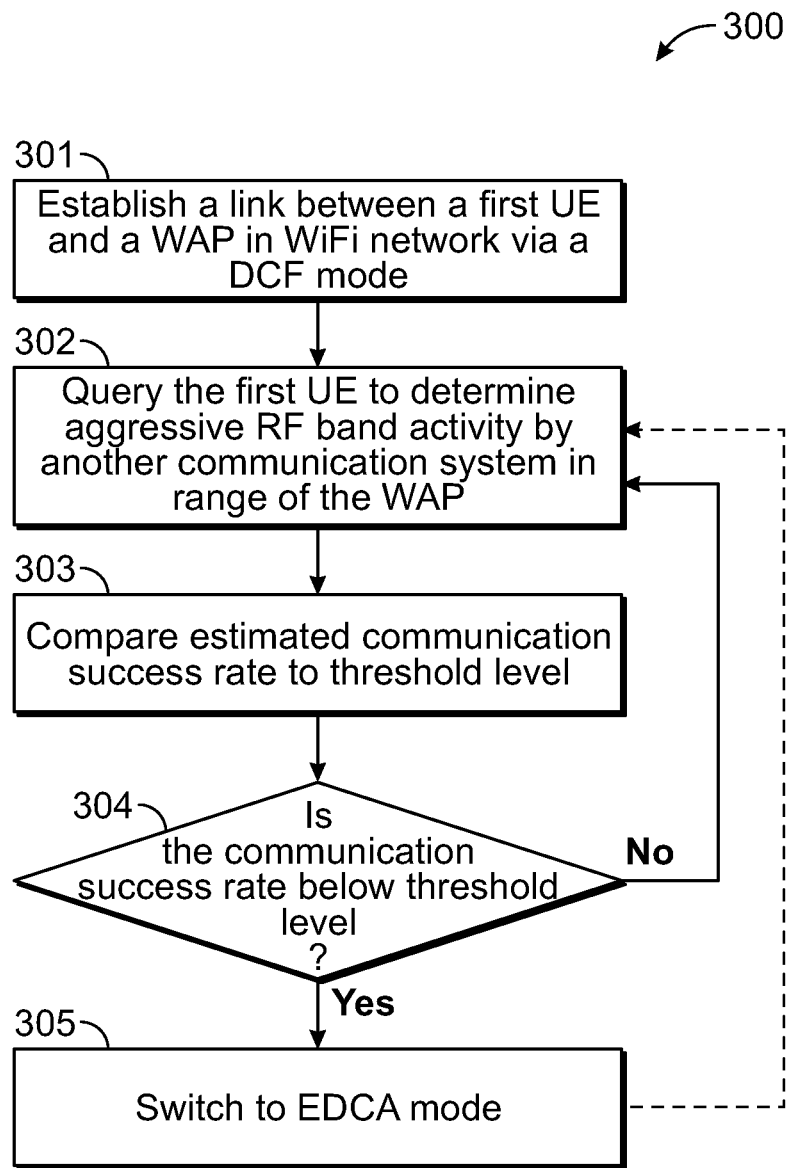
FIG. 9 is a flowchart illustrating an exemplary process of the communication system of FIG. 5.
Figure 10:
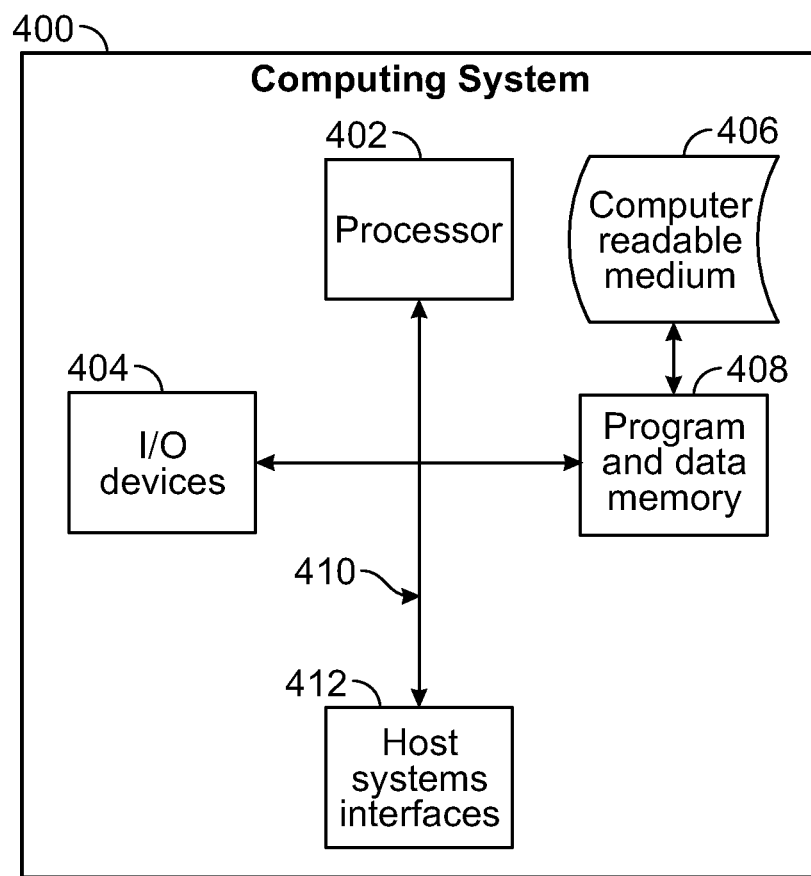
FIG. 10 is a block diagram of an exemplary computing system in which a computer readable medium provides instructions for performing methods herein.

With these above embodiments in mind, the communication processor 110 and the WAP 104 are operable to implement a process that directs the UEs 103 to operate in a contention free mode. FIG. 9 is a flowchart illustrating an exemplary process 300 of the communication system of FIG. 5. In this embodiment, the WAP 104 establishes a link between a first UE 103 (UE 103-1) in a typical DCF mode, in the process element 301. This allows the UEs 103 to contend for access to the WiFi network 105 through the WAP 104 as is normally done.

The WAP 104 may then query the first UE 103 (e.g., UE 103-1) to determine whether any aggressive RF band activity by another communication system is within range of the WAP 104, in the process element 302. For example, the UE 103 and others like it may be able to operate using WiFi and LTE communications. If an LTE communication system is operating within range of the WAP 104, the WAP 104 may begin to experience high collision rates and/or low successful transmission rates with the UE 103. Accordingly, the WAP 104 may direct the UE 103 to contact neighboring UEs 103 to determine how many UEs 103 are operating with the LTE communication system.

When a UE 103 is operating with an LTE network, the LTE RAN 102 reserves spectrum for each of its UEs. Accordingly, each of the UEs 103 communicating with the LTE RAN 102 may know its precise channel under which is communicating. In this regard, the WiFi WAP 104 can transmit a message to the UEs 103 (e.g., the one of the unused bits in the MAC headers) that directs the UEs 103 to report the frequencies which they are occupying. Then, based on the number of UEs 103 reporting back to the WAP 104, the communication processor 110 can compare the estimated communication success rate and/or the collision rate to the baseline level as mentioned above, in the process element 303, so as to determine whether the success rate is below a particular threshold level and/or whether the collision rate is above a particular threshold level, in the process element 304.

If the communication success rate is below the threshold level, then the WAP 104 directs its client UEs 103 to switch to the contention free mode, in the process element 305. This ensures that the UEs communicate with the WAP 104 in a contention free mode. That is, the UEs 103 are directed to operate without regard to other networks in the area, in essence becoming as aggressive as the LTE RAN 102. Otherwise, the WAP 104 continues to query the UEs 103 within range of the WAP 104 to essentially monitor the activity of any potential LTE networks. Similarly, after the WAP 104 directs the UE 103 to switch to the contention free mode, the WAP 104 continues to monitor the aggressive activity of the LTE networks, in the process element 302, to switch the UE to the contention based mode once the activity ceases, thereby allowing the WAP 104 to coexist with other WiFi WAPs in the vicinity.

Alternatively or additionally, the UEs 103, when attempting to connect to the WAP 104, may automatically transfer an indicator that the UEs 103 also have LTE capabilities. For example, an acknowledgment frame to the WiFi WAP 104, a UE 103 may indicate in an unused bit of a header to show that the UE 103 has the LTE capability. The WAP 104 detects this indicator and determines if the UE 103 is communicating with the LTE network. If so, then the WAP 104 issues a new control frame to the UE 103 that directs the UE 103 to turn the CSMA capability of the UE 103 off. This new WiFi control frame may include the existing PHY and MAC header per WiFi spec as well as a one bit indicator that controls the CSMA capability of the UE 103.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output (I/O) devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A communication system operable to improve communications when encountering aggressive communications, the system comprising:
   a wireless access point operable to link a first user equipment (UE) to a WiFi network via a contention based mode that directs the WAP to share radio frequency spectrum with other WAPs; and
   a communication processor operable to query at least the first UE to determine aggressive radio frequency (RF) band activity by another communication system in range of the WAP, to determine that the aggressive RF band activity by the other communication system is pushing communication with the first UE via the WAP below a threshold level, and based on the determination, direct the WAP to switch to a contention free mode to communicate with the first UE in contention free mode,
   wherein the WAP is operable to direct the UE to operate in the contention free mode in response to directing the WAP to switch to the contention free mode, and
   wherein the WAP is operable to alter an unused bit in a 802.11 MAC header to direct the UE to operate in the contention free mode.

2. The communication system of claim 1, wherein:
   the WAP is further operable the link between the first UE and the WAP comprises linking the first UE to the WiFi network in an unlicensed band of frequency spectrum.

3. The communication system of claim 1, wherein:
   the communication protocol of the communication network is a WiFi protocol and the communication protocol of the other communication system is a Long Term Evolution (LTE) protocol.

4. The communication system of claim 1, wherein:
   the WAP is further operable to direct the UEs to report back a number of the UEs in vicinity of the WAP and the other communication system.

5. The communication system of claim 1, wherein:
   the WAP is further operable to detect a Long Term Evolution (LTE) capability of a UE when the UE attempts to connect to the WAP; and
   the communication processor is further operable to determine a number of the UEs in vicinity of the WAP and the other communication system based on connection attempts by the UEs.

6. A method operable within a communication system for improving communications when encountering aggressive communications, the method comprising:
   establishing a link between a first user equipment (UE) and a wireless access point (WAP) in a WiFi network via a contention based mode that directs the WAP to share radio frequency spectrum with other WAPs;
   querying at least the first UE to determine aggressive radio frequency (RF) band activity by another communication system in range of the WAP;
   determining that the aggressive RF band activity by the other communication system is pushing communication with the first UE via the WAP below a threshold level;
   based on the determination, directing the WAP to switch to a contention free mode to communicate with the first UE in contention free mode;
   directing the UE to operate in the contention free mode in response to directing the WAP to switch to the contention free mode; and
   altering an unused bit in a 802.11 MAC header to direct the UE to operate in the contention free mode.

7. The method of claim 6, wherein:
   establishing the link between the first UE and the WAP comprises linking the first UE to the Wi-Fi network in an unlicensed band of frequency spectrum.

8. The method of claim 6, wherein:
   the communication protocol of the communication network is a WiFi protocol and the communication protocol of the other communication system is a Long Term Evolution (LTE) protocol.

9. The method of claim 6, further comprising:
   directing the UEs to report back the number of the one or more UEs in vicinity of the WAP and the other communication system.

10. The method of claim 6, further comprising:
    detecting a Long Term Evolution (LTE) capability of a UE when the UE attempts to connect to the WAP; and
    determining the number of the one or more UEs in vicinity of the WAP and the other communication system based on connection attempts by the UEs.

11. A non-transitory computer readable medium comprising instructions that, when executed by a communication processor operable within a communication system encountering aggressive communications, directs the communication processor to:
    establish a link between a first user equipment (UE) and a wireless access point (WAP) in a WiFi network via a contention based mode that directs the WAP to share radio frequency spectrum with other WAPs;
    query at least the first UE to determine aggressive radio frequency (RF) band activity by another communication system in range of the WAP;
    determine that the aggressive RF band activity by the other communication system is pushing communication with the first UE via the WAP below a threshold level; and
    based on the determination, direct the WAP to switch to a contention free mode to communicate with the first UE in contention free mode,
    wherein the WAP is operable to direct the UE to operate in the contention free mode in response to directing the WAP to switch to the contention free mode, and
    wherein the WAP is operable to alter an unused bit in a 802.11 MAC header to direct the UE to operate in the contention free mode.

12. The non-transitory computer readable medium of claim 11, further comprising instructions that direct the communication processor to:
    link the first UE to the Wi-Fi network in an unlicensed band of frequency spectrum.

13. The non-transitory computer readable medium of claim 11, wherein:
    the communication protocol of the communication network is a WiFi protocol and the communication protocol of the other communication system is a Long Term Evolution (LTE) protocol.

14. The non-transitory computer readable medium of claim 11, further comprising instructions that direct the communication processor to:
    direct the UEs to report back the number of the one or more UEs in vicinity of the WAP and the other communication system.

15. The non-transitory computer readable medium of claim 11, further comprising instructions that direct the communication processor to:
    detect a Long Term Evolution (LTE) capability of a UE when the UE attempts to connect to the WAP; and determine the number of the one or more UEs in vicinity of the WAP and the other communication system based on connection attempts by the UEs.

\* \* \* \* \*